United States Patent [19]
Wild et al.

[11] Patent Number: 5,671,351
[45] Date of Patent: Sep. 23, 1997

[54] SYSTEM AND METHOD FOR AUTOMATED TESTING AND MONITORING OF SOFTWARE APPLICATIONS

[75] Inventors: Ulrich H. H. Wild, Dallas; Mohamed Iyad Jabri, Plano, both of Tex.

[73] Assignee: Texas Instruments Incorporated, Dallas, Tex.

[21] Appl. No.: 420,969

[22] Filed: Apr. 13, 1995

[51] Int. Cl.⁶ ............................................. G06F 11/00
[52] U.S. Cl. .......................... 395/183.14; 395/183.22; 364/267; 364/267.91
[58] Field of Search .................. 395/183.14, 183.22, 395/183.08; 364/267.91, 267, 267.8, 275.5

[56] References Cited

U.S. PATENT DOCUMENTS

| | | | |
|---|---|---|---|
| 4,819,233 | 4/1989 | Delucia | 395/183.14 |
| 4,941,113 | 7/1990 | Dundics | 364/551.01 |
| 5,022,028 | 6/1991 | Edmonds | 395/183.14 |
| 5,164,912 | 11/1992 | Osborne | 364/580 |
| 5,200,958 | 4/1993 | Hamilton | 395/183.21 |
| 5,233,611 | 8/1993 | Triantafyllos | 395/183.22 |
| 5,243,603 | 9/1993 | Broeren | 371/27 |
| 5,323,393 | 6/1994 | Barrett | 370/85.8 |
| 5,371,883 | 12/1994 | Gross | 395/183.14 |
| 5,414,836 | 5/1995 | Baer | 395/183.14 |
| 5,428,618 | 6/1995 | Veki | 395/700 |
| 5,500,941 | 3/1996 | Gil | 395/183.14 |
| 5,537,653 | 7/1996 | Bianchini, Jr. | 395/183.07 X |
| 5,542,043 | 7/1996 | Cohen | 395/183.08 |

OTHER PUBLICATIONS

J. Scully, "Internal/External Test Harmonization Verticality and Performance Metrics, A Systems Approach", Autotestcon 1994, pp. 71–76.

*Primary Examiner*—Robert W. Beaulliel
*Assistant Examiner*—Dieu-Mirth Le
*Attorney, Agent, or Firm*—W. Daniel Swayze, Jr.; W. James Brady, III; Richard L. Donaldson

[57] ABSTRACT

The present invention includes a system and method for testing and monitoring an application (1*i h*). The application (1*i h*) includes and is operable to execute at least one test case operable to test at least one aspect of the application. The present invention includes a registrar within the test coordinator (1*i c*) for registering test cases associated with the application (1*i h*); a test user interface (1*i b*) for generating requests to initiate execution of the registered test cases; the test coordinator (1*i c*) also includes a mechanism for controlling the execution of the test cases in accordance with a set of policy parameters and for periodically providing status information during the execution of the test cases; and test history and reporting (1*i d*) responsive to the test user interface (1*i b*) and the test coordinator (1*i c*) for evaluating execution of the application (1*i h*) in accordance with the set of policy parameters.

8 Claims, 15 Drawing Sheets

Control Parameters

Test Execution: Controlled — 7a
Stop on Failure: No — 7b
Iteration Count: 1 — 7c
Delay Time (sec): 10 — 7d Apply — 7f    Cancel — 7g

*FIG. 7*

Report Description

Title: — 8a
                                                    — 8h
Desc: — 8b

Test Case Count: 25 — 8c
Test Case Place: Last n — 8d

Apply — 8f    Cancel — 8g

*FIG. 8*

Test Status and Control

| CIM Test Type: | Application | Loop 1/1 — 9b |
| 9a | | |
| Application: | Process Control | Loop 2/10 — 9d |
| 9c | | |
| Mechanism: | Transformation | Loop 7/10 — 9f |
| 9e | | |
| Test Case: | No Process Model | Loop 12/20 — 9h |
| 9g | | |

Estimated Time Remaining: 9i — 00:26:12    Pause — 9k

State: Paused, press Continue    Continue — 9l
9j

Message: Press Confirm to continue    Confirm — 9m
9n

Abort — 9o

FIG. 9

CIM Test Type Definition

CIM Test Type: [_____] — 10a

10b Application | 10c Mechanism | 10d Test Cases

Planner | Transformation | No Process Model
Factory Scheduler | Process Run | Goal Mismatch
Product Specification | Model Tuning | Controllable Mismatch
Process Control | Process Diagnosis | Failed Optimization Apply — 10f    Cancel — 10g

FIG. 10

| "MMST CIM" Test Report | | | | | | | 12 Feb 1992 |
|---|---|---|---|---|---|---|---|
| SUMMARY | | | | | | | |
| | | | | ---Times--- | | | |
| Exec'd | Passed | Failed | %Pass | Min | Mean | Max | SD |
| 7666 | 7527 | 139 | 98.2 | 1 | 15 | 120 | 16.3 |

| Application | Pass | Fail | %Pass | --Time(s)-- | | | SD |
|---|---|---|---|---|---|---|---|
| | | | | Min | Mean | Max | |
| Planner | 1577 | 11 | 99.3 | 10 | 30 | 120 | 12.3 |
| Factory Sched. | 1312 | 22 | 98.4 | 8 | 12 | 26 | 5.7 |
| Product Spec. | 2066 | 18 | 99.1 | 1 | 5 | 12 | 3.1 |
| Process Control | 2572 | 88 | 96.7 | 3 | 11 | 60 | 13.6 |
| etc | | | | | | | |

11a

11g — Cancel    11i — Print

*FIG. 11*

| "Process Control" Application Test Report | | | | | | | 2 Feb 1992 |
|---|---|---|---|---|---|---|---|
| SUMMARY | | | | | | | |
| | | | | ---Times--- | | | |
| Exec'd | Passed | Failed | %Pass | Min | Mean | Max | SD |
| 2660 | 2572 | 88 | 96.7 | 3 | 11 | 60 | 13.6 |

| Mechanism | Pass | Fail | %Pass | --Time(s)-- | | | SD 12a |
|---|---|---|---|---|---|---|---|
| | | | | Min | Mean | Max | |
| Transformation | 1072 | 64 | 94.4 | 3 | 11 | 60 | 12.3 |
| Process Run | 988 | 11 | 98.9 | 4 | 8 | 14 | 5.7 |
| Model Tuning | 247 | 8 | 96.9 | 2 | 7 | 12 | 3.1 |
| Process Diag. | 265 | 5 | 98.1 | 11 | 13 | 24 | 8.5 |
| etc | | | | | | | |

12g — Cancel    12i — Print

*FIG. 12*

PCTL "Transformation" Test Report — 12 Feb 1992

SUMMARY

| Exec'd | Passed | Failed | %Pass | Times Min | Mean | Max | SD |
|---|---|---|---|---|---|---|---|
| 1136 | 1072 | 64 | 94.4 | 3 | 11 | 60 | 19.7 |

| Test Case | Pass | Fail | %Pass | Time(s) Min | Mean | Max | SD |
|---|---|---|---|---|---|---|---|
| No Proc Model | 254 | 30 | 89.4 | 10 | 15 | 60 | 12.3 |
| Goal Mismatch | 272 | 12 | 95.8 | 6 | 10 | 18 | 5.7 |
| Contr. Mismatch | 280 | 4 | 98.9 | 3 | 7 | 12 | 3.1 |
| Failed Optim. | 266 | 18 | 93.7 | 28 | 37 | 54 | 8.5 |
| etc | | | | | | | |

13g — [Cancel]  13i — [Print]

PCTL "No Process Model" Test Report — 12 Feb 1992

SUMMARY

| Exec'd | Passed | Failed | %Pass | Times Min | Mean | Max | SD |
|---|---|---|---|---|---|---|---|
| 284 | 254 | 30 | 89.4 | 10 | 15 | 60 | 12.3 |

| Itr'n | Status | Start | Stop | Time |
|---|---|---|---|---|
| 23 | Pass | 20:32:12 | 20:32:21 | 19 |
| 24 | Pass | 20:32:51 | 20:33:18 | 27 |
| 25 | Pass | 20:33:48 | 20:34:21 | 33 |
| 26 | Fail | 20:34:51 | 20:35:09 | 18 |
| 27 | Pass | 20:35:39 | 20:35:58 | 19 |
| / | | | | |
| / | | | | |
| / | | | | |
| / | | | | |
| / | | | | |
| / | | | | |
| 34 | Pass | 20:48:33 | 20:48:55 | 22 |

[Make Reference] 14j  14g — [Cancel]  14i — [Print]

SYSTEM AND METHOD FOR AUTOMATED TESTING AND MONITORING OF SOFTWARE APPLICATIONS

NOTICE +ps COPYRIGHT© 1994 TEXAS INSTRUMENTS INCORPORATED

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD OF THE INVENTION

This invention relates to computer software testing tools, and more particularly, it relates to a method and system for continuous, automated testing and monitoring of software applications.

BACKGROUND OF THE INVENTION

An important aspect in the development and maintenance of any computer implemented system is the ability to ensure system quality and integrity. Thorough testing of the system throughout the system life cycle is one method by which quality and integrity are ensured. Testing thoroughness encompasses testing during the various stages of the system life cycle of as many aspects of the system as possible by as many of the people involved in the system development process as possible. Therefore, during the various stages of the system life cycle several types of testing are performed by the various people involved at each stage.

The stages of the system life cycle include analysis, design, implementation, testing, deployment, maintenance and upgrades. Prior art systems perform most testing before the system is installed although some testing is also performed after installation when the application is in a production environment.

The types of testing performed can be categorized by the purpose served in performing the tests. One test type is internal functionality testing. Internal functionality testing is performed to confirm that a system is functioning in accordance with the design. A second test type is integration testing. Integration testing is designed primarily to determine whether the system performs properly while operating in a production environment which may include direct and indirect interaction with various other subsystems and components.

Another method of classifying system testing is in terms of the person or persons initiating or controlling the execution of the tests. The people involved in the system development life cycle include a system designer or system developer, a system administrator and an end user. The larger the system under development, the larger the number of people involved. Furthermore, for larger systems in particular, each person's involvement will typically span across several stages of the system life cycle. Coordinating thorough system testing in such an environment is at best difficult as the number of people and the scope of their involvement increase.

Generally, each of the test types, no matter who performs them or at what stage in the system life cycle they are performed, is implemented using test cases. A test case includes a set of inputs, and execution conditions for a component under test. The component tested may include hardware, software, firmware, and combinations of these. As the system development progresses and as more people become involved, additional test cases are created to test overall system functionality and operating performance. However, without centralized coordination and standardized testing procedures, numerous test cases of varying structure and format are created with little or no documentation as to their existence and usage. Furthermore, after the system is installed, many test cases are usually discarded and organized testing of the entire system is haphazard at best.

In general, once the system is brought on-line into a normal production environment, the testing effort usually ends. But, even with extensive pre-production testing, problems still arise which necessitate system changes. Once the system is in production however, a coordinated testing effort to thoroughly verify and test these changes is usually impossible. Furthermore, a post-production, coordinated testing and monitoring effort is usually more difficult to implement and maintain because of the possible affect on other production activities. The possible impact of post-installation testing on a production environment ranges from slower response times to virtual stoppage of any production activities relying on the system under test. As a result, little or no coordinated testing activity is usually done once a system is put into production.

The detection of post-production anomalies which may indicate potential failures in the system is also problematic. In some cases, the first notification that a problem exists is erroneous reporting data. In the worst case, the first notification of a production problem is the complete collapse of the system in the midst of a production run.

What is needed is a testing tool which can be used throughout the system life cycle and which utilizes test cases and previous test case execution results produced both during and after system development to provide continuous testing and monitoring of system functionality and performance with a minimum impact upon production activities which rely on the system being monitored.

SUMMARY OF THE INVENTION

The present invention comprises a method and system for continuous testing and monitoring of the functionality and performance of an application system throughout the system life cycle with minimum impact upon other production activities which rely upon the system being tested and monitored.

One embodiment of the system of the present invention includes a test coordinator responsive to the application for registering test cases associated with the application; a test user interface for accepting user requests to execute the test cases associated with the application; the test coordinator responsive to the test user interface for controlling execution of the registered test cases in accordance with a set of policy parameters and for periodically providing status information during the execution of the test cases; the test coordinator further operable to initiate execution of the registered test cases by the application and to store execution results of the test cases; and a test history and reporting mechanism responsive to the test user interface and the test coordinator for evaluating the execution results of the test cases in accordance with reference test case results.

One embodiment of the method of the present invention comprises the steps of providing one or more test cases associated with the application; accepting user requests to execute the test cases; controlling the execution of the test cases in accordance to a set of policy parameters; periodically generating status information during the execution of the test cases; and evaluating results of the execution of the test cases in accordance with reference test case results.

BRIEF DESCRIPTION OF THE DRAWINGS

The above mentioned advantages and features of the present invention are described below in connection with the accompanying drawings, wherein:

FIGS. 3–10 illustrate one embodiment of user interface screens of the present invention;

FIG. 11 shows an exemplary system level report generated in the present invention;

FIG. 12 shows an exemplary application level report generated in the present invention;

FIG. 13 shows an exemplary mechanism level report generated in the present invention;

FIG. 14 shows an exemplary test case level report generated in the present invention;

DETAILED DESCRIPTION OF THE INVENTION

The current embodiment of the present invention includes an automated testing and monitoring system which provides automated execution, monitoring, and validation of test cases which are designed to verify the functionality, operability, etc. of various system components (software, hardware, and firmware) that make up the system being monitored or under test. The current embodiment of the present invention further facilitates both pre- and post-installation monitoring, testing and diagnosis of the system to support system maintenance throughout the system life cycle.

Figure 1:
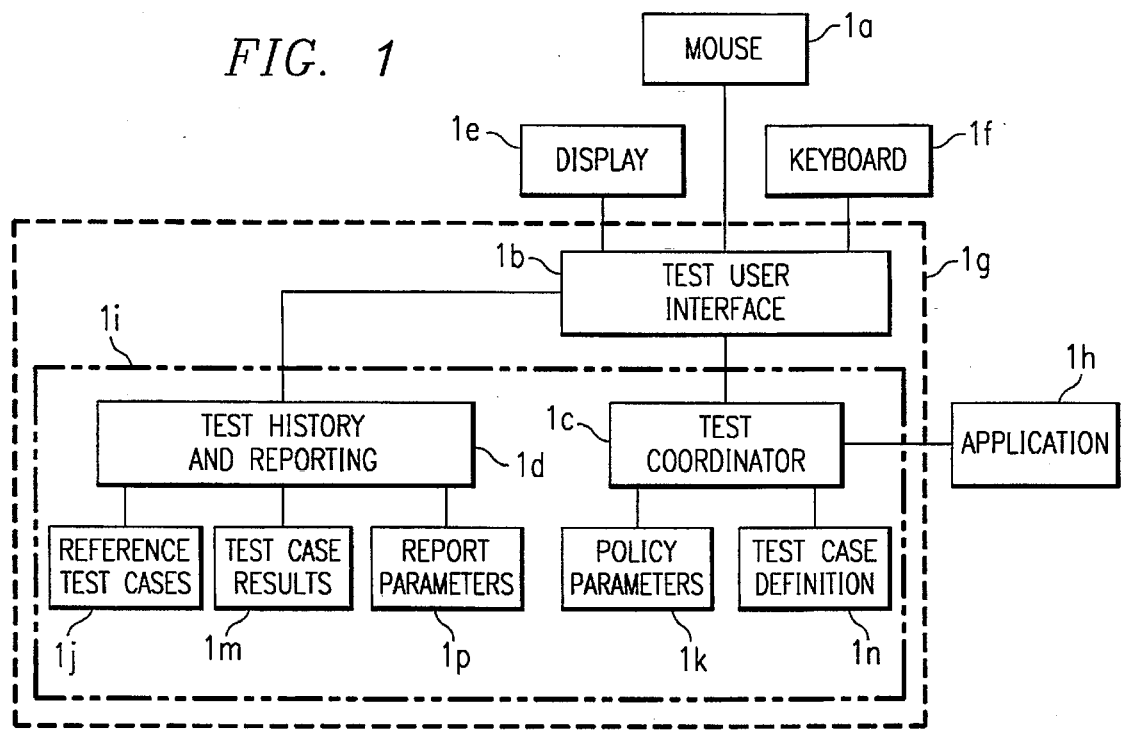
FIG. 1 is a block diagram illustrating the current embodiment of the present invention.

The current embodiment of the present invention includes the use of a general purpose digital computer as illustrated generally in FIG. 1. The general purpose digital computer, as shown generally in FIG. 1, includes a display $1e$, data entry device (such as a keyboard $1f$), a pointing device (such as a mouse $1a$), and a processor $1g$. The system as illustrated in FIG. 1 includes a test user interface $1b$, a test coordinator $1c$, test history and reporting $1d$ as on object oriented database $1i$ included within the processor $1g$.

Also included within the object oriented database $1i$ are a reference test cases object $1j$ which is coupled to test history and reporting $1d$, a policy parameters object $1k$ which is coupled to the test coordinator $1c$, a test case results object $1m$ which is coupled to the test history and reporting $1d$, a report parameters object $1p$ which is coupled to test history and reporting $1d$ and a test case definition object $1n$ which is coupled to the test user interface $1b$. FIG. 1 also illustrates, within the processor $1g$, an application $1h$ coupled to the test coordinator $1c$ which is being monitored and tested using the present invention.

Through the test user interface $1b$, the user pre-defines the test cases associated with the application under test $1h$ and also pre-defines the sequence of execution of the associated test cases through a testing hierarchy. This information is stored in the object test case definition $1n$ in the object oriented database $1i$. A test case includes a test case name, a test case description, a pre-test message, a test message, a post-test message, and a test mode. The pre-test message, when executed, sets up the operating environment in preparation for the execution of the actual test which is invoked using the test message. Once the test execution is complete, execution of the post-test message resets the operating environment, stores the results of the test in the object test case results $1m$, and provides a test results object identification (ID) which is used to access the stored results data. The stored results data includes a test start time and stop time which are used in comparing various execution results of the test case.

To facilitate on-going testing in a production environment, a test mode, assigned by the user, is used to classify the test cases, in terms of their effect on other production activities, as either non-disruptive, minimally disruptive, disruptive or destructive. A non-disruptive test case causes no disruption of other production operations. A minimally disruptive test case causes some disruption of other production activities but may be initiated at any time without any serious impact on production operations, i.e., the production activities should still be capable of performing their assigned tasks. A disruptive test case causes serious disruption of production operations. A destructive test case will prevent the application $1h$ from performing its assigned task and possibly stop production operations completely. Both disruptive and destructive test cases should only be initiated, whether manually or automatically, when an interruption of the production support can or must be tolerated.

Figure 20:
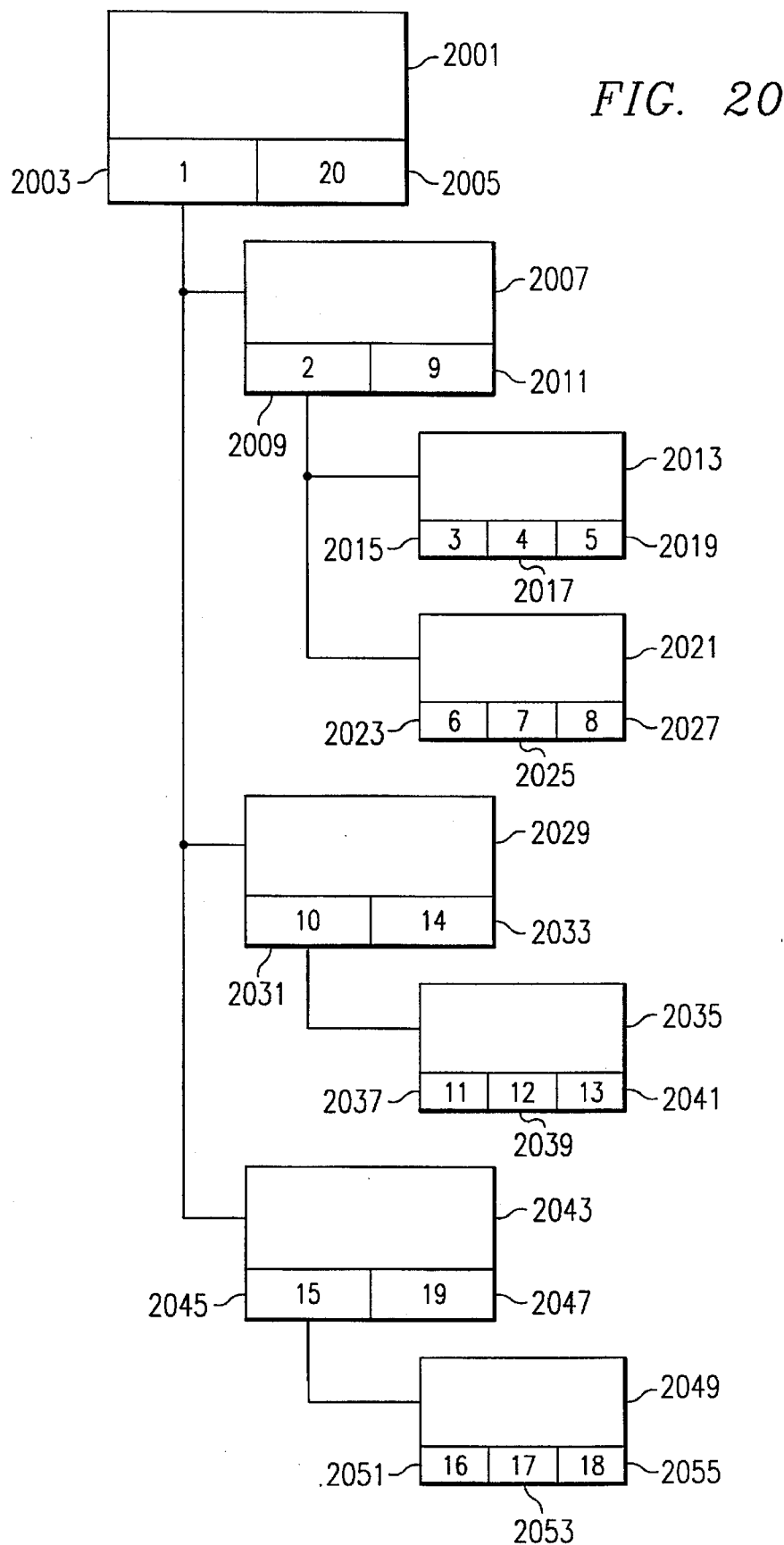
FIG. 20 shows a flow diagram illustrating the sequence of execution of test cases in the present invention.

As illustrated generally in FIG. 20, the test cases are organized into a testing hierarchy which defines generally the sequence of presentation and execution of the pre-defined test cases. In the testing hierarchy illustrated in FIG. 20, one or more test cases (represented as blocks 2013, 2021, 2035 and 2049) are combined into one or more test groups (represented as blocks 2007, 2029 and 2043). A test group (block 2007, 2029 or 2043) is defined by a unique test group name, a description, a pre-test message, and a post-test message. One or more test groups are combined to form an application test sequence (represented by block 2001). The application test sequence (block 2001) is defined by a unique application test sequence name, a description, a pre-test message, and a post-test message. One or more application test sequences are combined to form a system test sequence. The system test sequence is defined by a unique system test sequence name and a description.

FIG. 20 also illustrates generally the order of execution of the pre-test, test and post-test messages defined in the testing hierarchy for a system tested using one embodiment of the present invention. Once the test cases and the testing hierarchy are defined, the test cases are executed through the test user interface 1b by sending an "execute" message to the test coordinator 1c which includes either a system test sequence name, an application test sequence name or a test group name indicating the level in the testing hierarchy at which to start test case execution. The order of execution of the various pre-test, test, and post-test messages, i.e., if the testing hierarchy shown in FIG. 20 is invoked at the applications level, is indicated by the sequence number entered in each block representing a pre-test, test or post-test message. Thus, the sequence of execution for the exemplary testing hierarchy illustrated in FIG. 20 is block 2003, 2009, 2015, 2017, 2019, 2023, 2025, 2027, 2011, 2031, 2037, 2039, 2041, 2033, 2045, 2051, 2053, 2055, 2047, and 2005.

The operating environment of the test user interface 1b during test case execution is controlled using a set of parameters called policy variables which are defined initially during installation of one embodiment of the system of the present invention and instantiated in the policy parameters object 1k. The policy variables allow the user defining or executing the test cases to control the behavior of the system testing environment. The policy variables used in one embodiment of the present invention include Test Execution, Stop on Failure, Iteration Count, Delay Mode, Delay Count, Delay Time, Lower Delay, Upper Delay, Start Time, Execute Time, Performance Delta, and Performance Override.

The policy variable Test Execution controls the number of times and the duration of test case execution. The possible values of the policy variable Test Execution include: Controlled (executes all selected test cases the number of times specified in the policy variable Iteration Count delaying for the amount of time specified in the policy variable Delay Time between each test case or test cycle); Single Cycle (executes all included test cases one time and then stops); Single Test (executes a single test case and then stops); Timed (executes the selected test cases starting at the time specified in the policy variable Start Time for at least the amount of time specified in the policy variable Execute Time waiting for the amount of time specified in the policy variable Delay Time between each test case execution); and Continuous (executes the selected test cases continuously). The default value for the policy variable Test Execution is Controlled.

The policy variable Step on Failure determines the action taken when an executed test case fails. The possible values of the policy variable Stop on Failure include Yes (stop when a test case failure is detected) and No (continue execution when a test case failure is detected). The default value of the policy variable Stop on Failure is Yes.

The policy variable Iteration Count is an integer variable which specifies the number of times the selected test cases will be executed. The default value of the policy variable Iteration Count is one (1) indicating that each selected test case is executed one time.

The policy variable Delay Mode indicates the points during test case execution at which the delay time specified by the policy variable Delay Time is initiated. The possible values of the policy variable Delay Mode include Cycle (the time specified in the policy variable Delay Time is inserted after each test cycle) and Test (waits for the amount of time specified in the policy variable Delay Time after each test case is executed). The default value of the policy variable Delay Mode is Cycle.

The policy variable Delay Count is an integer which controls the number of test cases executed between delays specified by the policy Delay Mode. In other words, the policy variable Delay Count defines the number of test cases which make up a test cycle. The default value of the policy variable Delay Count is one (1) indicating that one test case is executed between each delay specified by the policy variable Delay Mode.

The policy variable Delay Time indicates the mount of wait time, in seconds, inserted between each test case or between each test cycle. The default value of the policy variable Delay Time is 0 indicating that the test case or test cycle is executed as soon as possible. A null or empty value in the policy variable Delay Time specifies that the delay time between each test case or test cycle execution is randomly selected between the time specified in the policy variables Lower Delay and Upper Delay. The default value of the policy variable Lower Delay is 0. The default value of the policy variable Upper Delay is 60. The value in the policy variable Upper Delay must also be greater than the value in the policy variable Lower Delay.

The policy variable Start Time controls the time at which the selected test cases will start executing. The default value of the policy variable Start Time is null indicating that test cases are executed immediately.

The policy variable Execute Time specifies the duration for which the selected test cases are executed. The test case execution will terminate at the first test case or test cycle break after the time has expired. The default value of the policy variable Execute Time is one (1) indicating test case or test cycle execution of at least one second.

The policy variable Performance Delta sets an amount by which the performance of a test case may vary. A test case fails if actual performance varies from the performance of a reference test case by this amount. The default value of the policy variable Performance Delta is ten (10) indicating that a ten percent performance variation may occur before the test case execution is considered to have failed. Note that the present invention uses the policy variable Performance Delta to detect both improvements and degradations in performance. Both are treated as anomalies which may trigger some action in response which includes a notification to a user of the performance variation.

The policy variable Performance Override specifies that the application is to transition off-line or stay on-line even if the performance degradation is outside the limit specified in the policy variable Performance Delta. The possible values of the policy variable Performance Override are False (transition off-line if performance failed) and True (stay on-line regardless of performance degradation).

Using the policy variables to define the operating environment, test case execution may be automatically initiated in one of several ways. The execution of a test case may be initiated at system start up before the application under test 1h is brought on-line in the production environment, in response to a notification of an event, at or after a preselected time, or upon detection of a particular event.

The system of the present invention also includes mechanisms within the application under test 1h to initiate test case execution as part of a self-diagnosis by the application under test 1h during a production cycle whereby the system initiates tests either automatically upon start up or on an event driven basis. In this manner, the system of the present invention provides for continuous monitoring of the system or application 1h being tested and monitored.

Thus, the current embodiment of the system of the present invention includes a component as part of the application 1h which is initiated whenever the application 1h is brought on-line in the production environment. This component within the application 1h generates instructions to the test coordinator 1c to execute, for example, a set of test case registered under the testing hierarchy which determine whether or not the application 1h is operable in the current environment.

A second embodiment of the system of the present invention includes mechanisms within the application 1h to generate a request to the test coordinator 1c to initiate another set of test cases registered under the testing hierarchy in response to a notification of the occurrence of a pre-selected event. In this embodiment of the present invention, test case execution is initiated in response to a notification from, for example, an event tracking system that a selected event has occurred. The category of test cases executed in this embodiment of the test user interface 1b include any non-disruptive or minimally disruptive test cases in that test cases executed for serf-diagnosis purposes are usually executed while the system is in a production mode.

The simplest trigger event in the second embodiment of the present invention is a time expiration. Examples of time expiration event triggers include the execution of a particular test case or cases every hour or execution of a particular test case or cases at midnight.

A more powerful event for triggering the execution of test cases is the detection of an anomaly. This is accomplished by subscribing to bulletins posted to a bulletin board administered by the event tracking system which monitors the system activity of applications including the application 1b. When any anomaly (e.g., slow response indicated by the time difference between two bulletins) is detected by the application under test 1b, commands are sent to the test coordinator 1c to execute selected test cases for the suspected portion of the application 1h responsible for the anomaly. Thus, the application 1h, using the system and method of the present invention, should also be operable to send and receive messages to and from the bulletin board to enable or disable the posting of selected bulletin categories. This may also require that the application 1h keep track of the number of enable requests and disable requests it has received to ensure that a posting is not disabled as long as some object within the application 1h is a subscribing party to that posting.

A final triggering event for the execution of self-diagnosis test cases are events detected by the application 1h. Included in this trigger mechanism, as discussed hereinabove, are time limits between two events. Detection of events by the application 1h facilitates the detection of system performance variations prior to any impact on other activities in the production environment. When one or more anomalies are detected by the application 1h, the application 1h initiates self-diagnosis. The self-diagnosis includes the execution of test cases in an attempt to identify the cause or causes of the detected anomaly. The diagnostic test cases are designed to execute in three phases, however, specific types of anomalies and events detected during system monitoring could directly trigger the execution of test cases in phase two or phase three.

The first phase makes use of non-disruptive and minimally disruptive test cases in an effort to identify the cause of the anomalies. This permits the activities in the production environment to continue with minimal interference. While in this phase, the system of the present invention may limit the number of tests per unit time that it executes and attempts to minimize resource usage (e.g. minimize processor 1g time consumed). The result of this type of diagnosis may be sufficient to send notifications requesting corrective action.

The second phase makes use of disruptive test cases while attempting to identify the cause for the detected anomalies. This phase will have a negative impact on the performance of the production operation. Although production support may not be interrupted, it may experience slower response to production related requests. During this phase, the goal of the system of the present invention is not to conserve resource consumption but to identify the cause of the anomalies as soon as possible, submit an action request and provide corrective action recommendations.

The final phase uses destructive test suites which will prevent the continuance of normal production activities. The components of the application 1h are requested to prepare themselves for destructive testing and the tests will start when all application components are prepared. This diagnostic phase will stop all requests to and from production elements. It is, however, possible for some production elements to complete processing as long as no system support is required from the application 1h being diagnosed.

Each facility using the system and method of the present invention to monitor the application 1h may specify the anomalies which may be detected by the application 1h and, using the testing hierarchy, specify the test cases to execute in response to the detected anomalies and their associated diagnostic starting phase. In addition, each facility may specify the terminating phase. This gives the facility complete control over the self-diagnosis action.

Another embodiment of the present invention includes the test user interface 1b, illustrated generally in FIGS. 3–14, which provides user access to all testing related information through a series of Graphical User Interfaces (GUI's) presented on display 1e for manual test case execution and monitoring. In this embodiment of the present invention, the user selects and initiates the execution of test cases and requests test case execution reports. In addition, the user may input test case control specifications (via the policy variables), monitor the status of the test case execution, exercise override control (e.g., pause the testing execution) over test case execution, and identify selected test case execution results to be included in the object reference test cases 1j as references for evaluation of future executions of the same test case.

Figure 3:
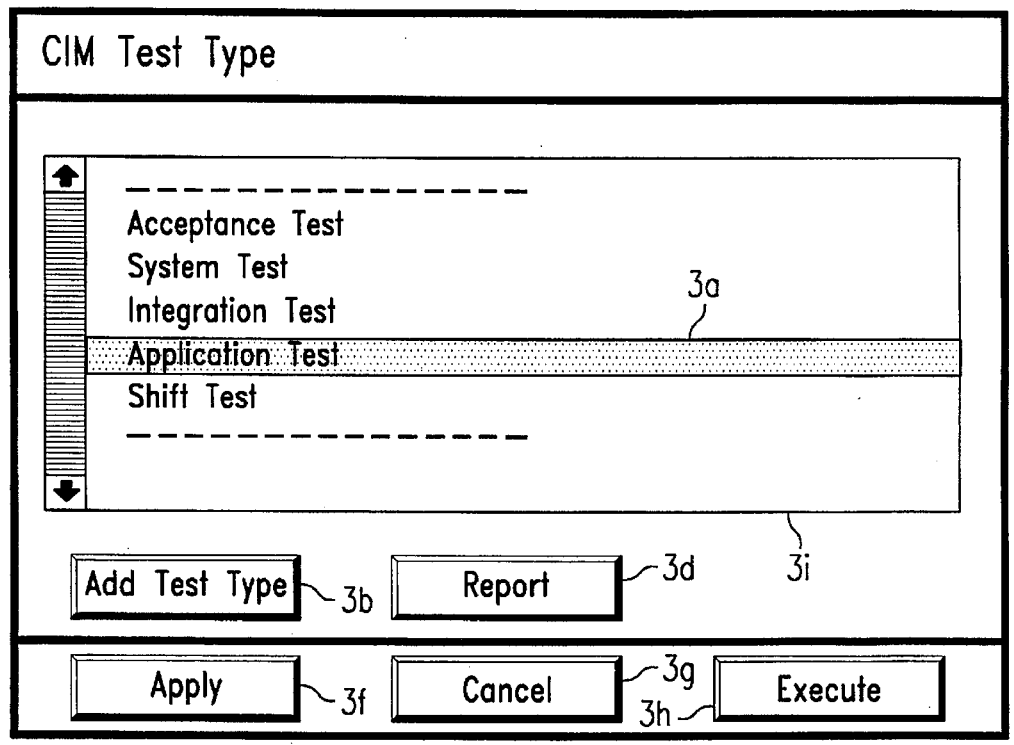
Figure 15:
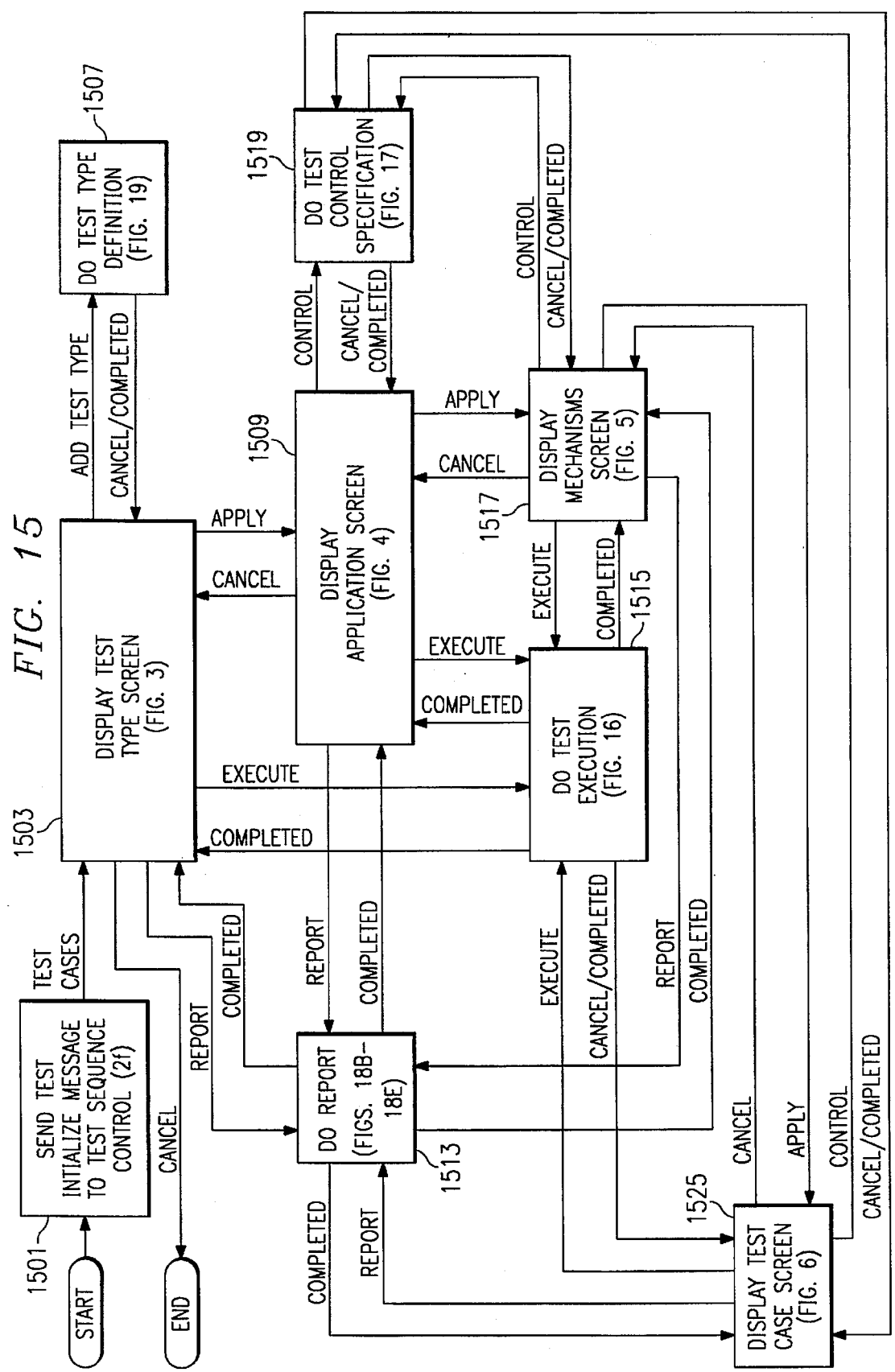
FIG. 15 illustrates the operation of the test user interface of the present invention.

The operation of the test user interface 1b of the present invention is described generally in the flow graphs in FIGS. 15–19 and 21–26. Referring to FIG. 15, this embodiment of the test user interface 1b starts at block 1501 by sending an "initialize" message to the test sequence control 2f of the test coordinator 1c. If test types have been defined previously, the Test Type screen shown in FIG. 3 is displayed at block 1503 in FIG. 15 on display 1e. If no test types are available, the selection list 3i in FIG. 3 will be empty.

The Test Type screen of FIG. 3 shows the user a listing of the currently available test types. There are five actions available to the user from the Test Type screen in FIG. 3. The user may, using the mouse 1a, select the Add Test Type button 3b to define another test type. The user may select a test type, for example, the test type "Application Test" is shown selected at 3a, then select the Report button 3d to generate an application level report. The user may also select one of the displayed test types and then select the Apply button 3f to continue with the test selection, as shown at block 1509 in the flow diagram in FIG. 15, with the display of the Applications screen, FIG. 4. If the user selects a test type then selects the Execute button 3h, the present invention starts the execution of every test case registered in the testing hierarchy under the selected test type. Control is then transferred to block 1515 in FIG. 15 where the test coordinator 1c executes all tests in accordance with the test execution flow diagram in FIG. 16, discussed hereinbelow. The Cancel button 3g may be selected from the Test Type screen in FIG. 3 to exit.

Figure 19:
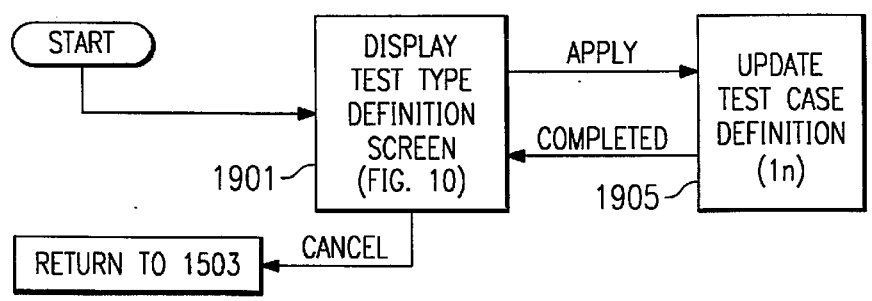
FIG. 19 shows the operation of the add test type button selectable through the test user interface of the present invention.

Selection of the Add Test Type button 3b, transfers execution, as shown at block 1507 in FIG. 15, to block 1901 in FIG. 19 which causes the test user interface 1b to display the Test Type Definition screen, FIG. 10. From the Test Type Definition screen shown in FIG. 10, the user enters a new test type name at 10a, then generates the testing hierarchy defining the new test type by selecting an application name from the names displayed in the application selection list 10b, selecting the desired mechanism name from a mechanism selection list 10c, and finally selecting one or more test cases from the test case names displayed in multi-selection test case list 10d. This process may be repeated to define more application and mechanism level testing hierarchies under the new test type. Once the information defining the new test type is entered, the user may then select the Apply button 10f or the Cancel button 10g.

If the user selects the Cancel button 10g from the Test Type Definition screen, FIG. 10, the information entered defining the new test type is discarded and execution continues at block 1503 in FIG. 15 by redisplaying the Test Types screen, FIG. 3.

If the user selects the Apply button 10f on the Test Type Definition screen, FIG. 10, the processing in block 1905 in FIG. 19 sends an instruction to the test sequence control 2f of the test coordinator 1c to update the object test case definition 1n in the object oriented database 1i. Once the test sequence control 2f completes the processing necessary to add the new test type, execution then continues at block 1503 in FIG. 15 by redisplaying the Test Type screen, FIG. 3. The new test type is now available for selection from the Test Type screen, FIG. 3.

Figure 18A:
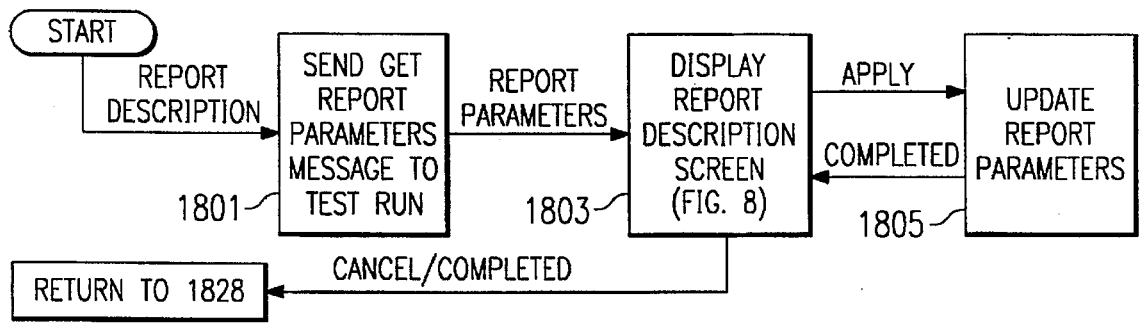
FIG. 18A illustrates the operation of the report button selectable through the test user interface of the present invention.
Figure 18B:
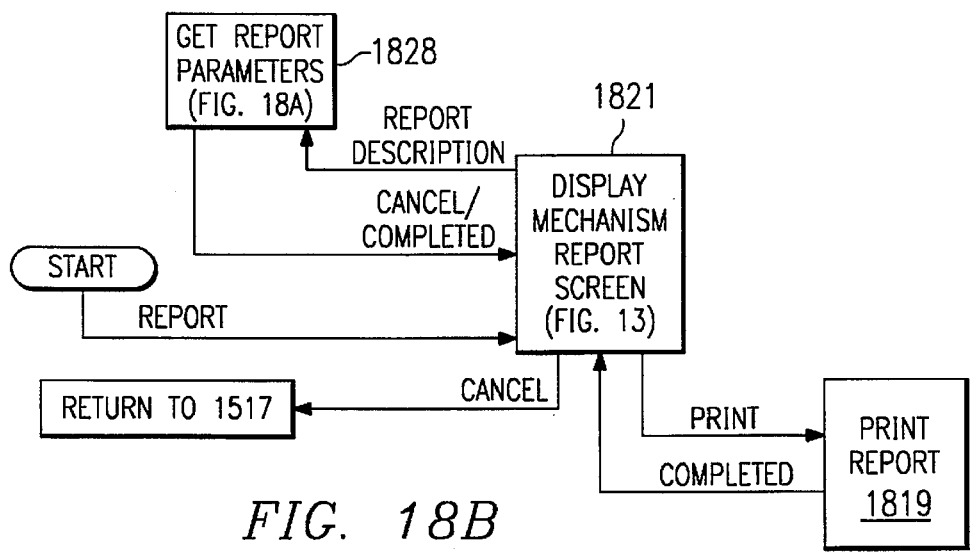
FIGS. 18B–18F depict the operation of the print button selectable through the test user interface of the present invention.
Figure 18C:
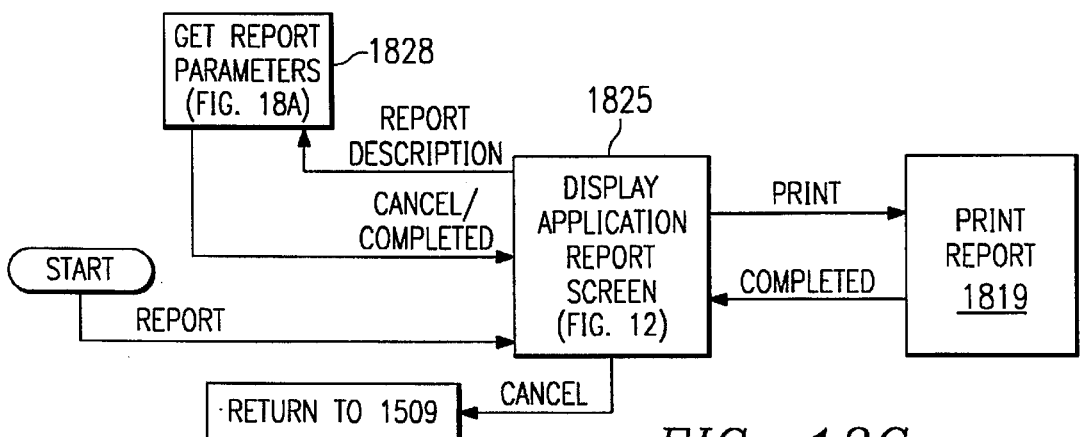
Figure 18D:
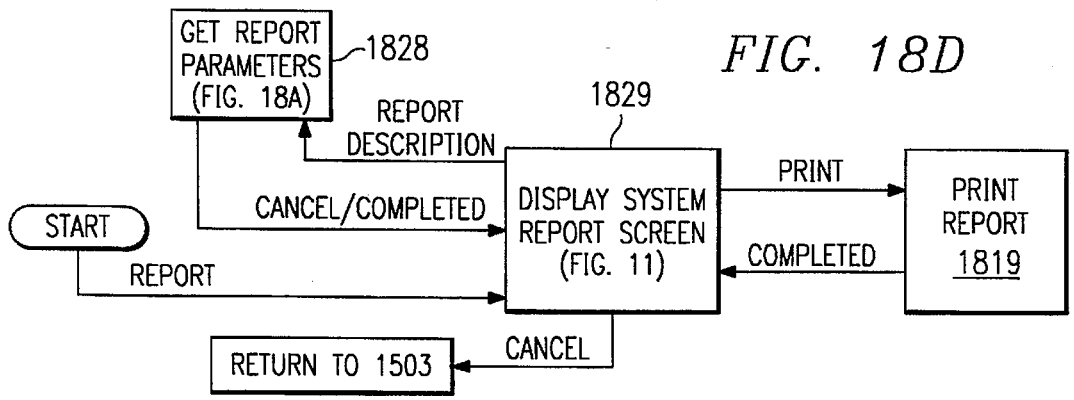

Returning to the Test Type Screen, FIG. 3, if the user selects a test type then selects the Report button 3d on the Test Type screen, FIG. 3, execution proceeds, as shown at block 1513 in FIG. 15, with block 1829 in FIG. 18D where control proceeds, as shown at block 1828, to the data flow diagram in FIG. 18A with the display of the Report Description screen, FIG. 8. Through the Report Description screen, FIG. 8, the user can modify the report parameters used to generate the corresponding report.

The Report Description screen, FIG. 8, includes a title 8a, a report description 8b, a test case count 8c and a test case place parameter selected at 8d. The user may enter and modify the values of the report parameters on the Report Description screen in FIG. 8. Once the reporting parameters are acceptable, the user then selects either the Cancel button 8g, which cancels any modifications made through the Report Description screen, FIG. 8, or the Apply button 8f which saves any modifications made by the user as shown at block 1805 in FIG. 18A.

If the user selects the Apply button 8f on the Report Description screen shown in FIG. 8, execution proceeds to block 1805 where an "update report parameters" message is sent to the test run 2b of the test history and reporting 1d. Control then returns from block 1805 to block 1803 in FIG. 18A with the display of the Report Description screen, FIG. 8, allowing the user to repeatedly modify the report parameters.

Upon receipt of the reporting parameters, control returns to block 1829 in FIG. 18D where the Test Type Report screen in FIG. 11 is displayed.

From the Test Type Report screen in FIG. 11, the user can select the Cancel button 11g or the Print button 11i. If the user selects the Cancel button 11g, control returns to block 1503 in FIG. 15. If the user selects the Print button 11i, a "print" message is sent at block 1819 to the test reporter 2e which prints the system level report shown in FIG. 11. Upon completion, control returns to block 1829 in FIG. 18D.

Returning again to the Test Types screen, FIG. 3 shows at 3a that the test type "Application Test" has been selected. If the user then selects the Apply button 3f on the Test Types screen shown in FIG. 3, execution proceeds, as shown in FIG. 15 at block 1509, with the display of the Applications screen shown in FIG. 4 which lists all applications available under the test type selected from the Test Types screen, FIG. 3.

From the Applications screen shown in FIG. 4, the user again has five options as shown at block 1509 in FIG. 15. The user may select the Cancel button 4g; select the Control button 4c to define parameters used by the test coordinator 1c in test case execution; select the Report button 4d to define parameters used by test history and reporting 1d in generating the application level report; select an application then select the Execute button 4h; or select an application then select the Apply button 4f.

Figure 4:
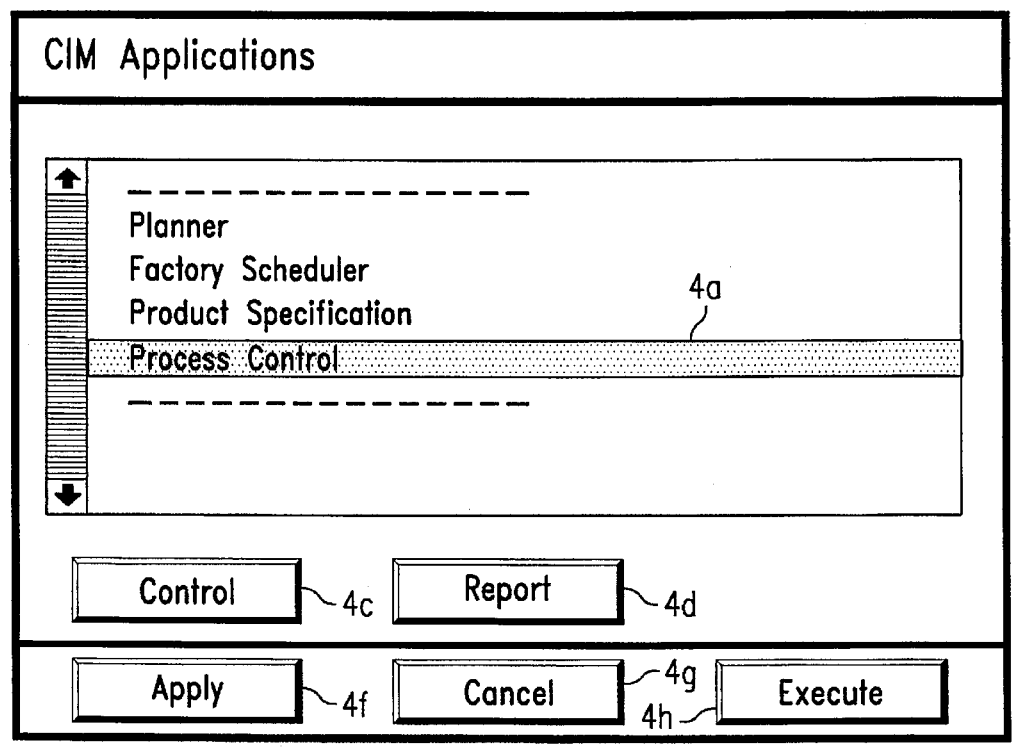
Figure 16:
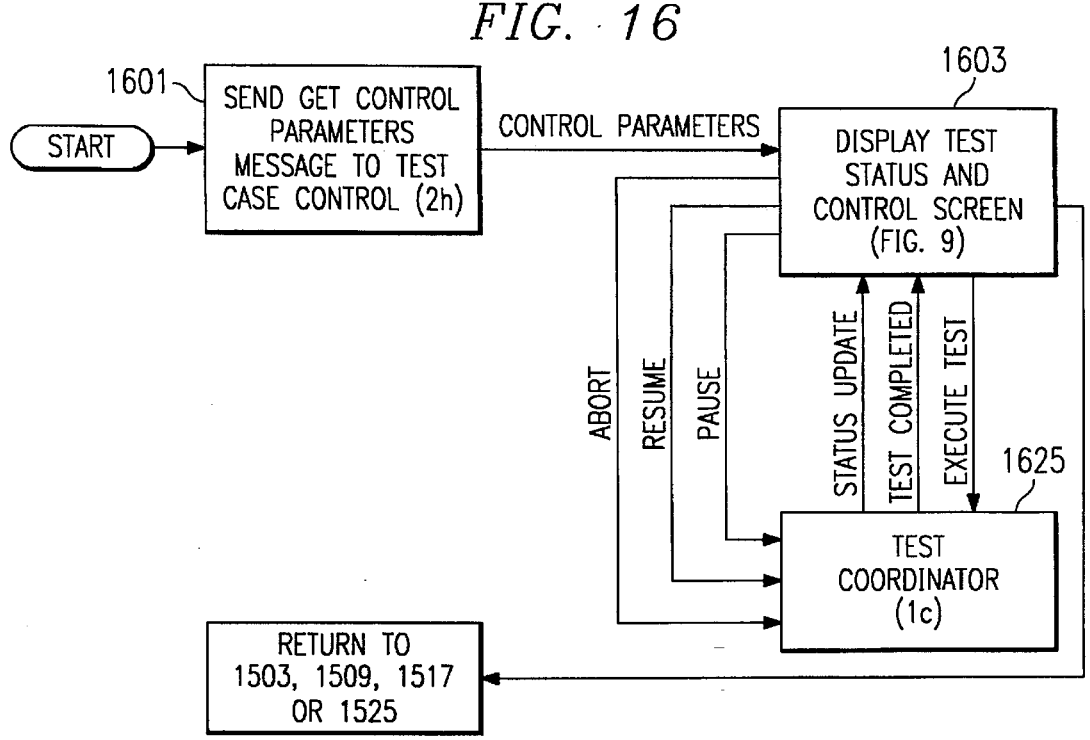
FIG. 16 illustrates the operation of the execute button selectable through the test user interface of the present invention.

Selection of the Report button 4d from the Applications screen in FIG. 4 causes the test history and reporting 1d to generate, in accordance with the flow diagram illustrated in FIG. 18C, the Applications Report screen, FIG. 12. Selection of the Apply button 4f passes control to the Mechanisms screen, FIG. 5. Selection of the Cancel button 4g returns the user to the Test Type screen, FIG. 3. Selection of the Execute button 4h, after selecting, for example, the application "Process Control" at 4a in FIG. 4, starts the execution of test cases described in the testing hierarchy under the application "Process Control." The execution of test cases, illustrated in FIG. 16, is discussed in more detail hereinbelow.

Figure 17:
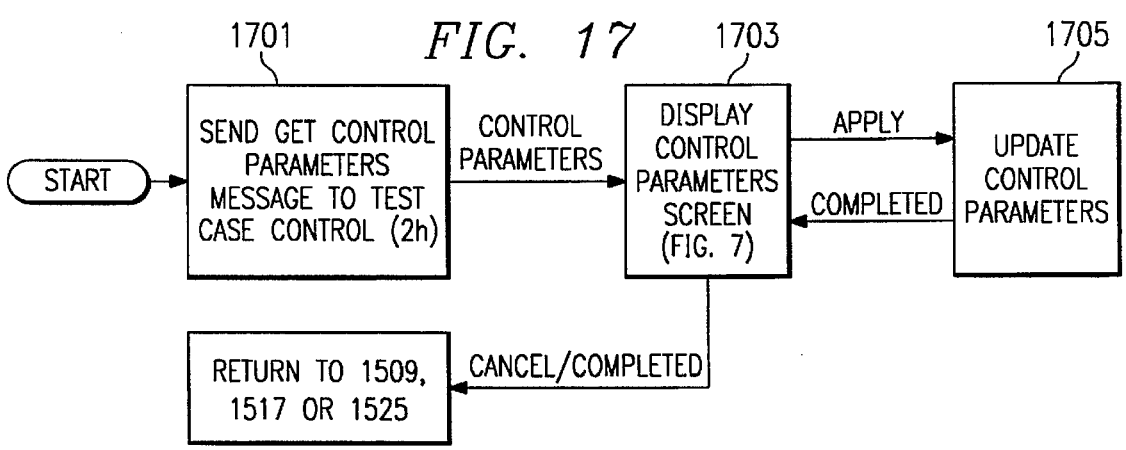
FIG. 17 shows the operation of the control button selectable through the test user interface of the present invention.

If the user selects the Control button 4c from the Applications screen, FIG. 4, execution continues, as shown at block 1519 in FIG. 15, with the control flow diagram shown in FIG. 17. FIG. 17 starts, at block 1701, by sending a "get control parameters" message to test case control 2h. Upon receipt of the control parameters from test case control 2h, the Control Parameters screen, FIG. 7, is displayed at block 1703. The control parameters available for modification on the Control Parameters screen in FIG. 7 include the policy variables Test Execution 7a, Stop on Failure 7b, Iteration Count 7c and Delay Time 7c, discussed in more detail hereinabove. Once the control parameters are acceptable, the user then selects either the Apply button 7f or the Cancel button 7g.

If the user selects the Apply button 7f on the Control Parameters screen in FIG. 7, execution proceeds from block 1703 to block 1705 where an "update control parameters" message is sent to the test case control 2h of the test coordinator 1c. Upon completion of the update, control returns to block 1703 in FIG. 17 allowing the user to repeatedly review and change the control parameters.

If the User selects the Cancel button 7g on the Control Parameters screen shown in FIG. 7, execution returns to FIG. 15 at block 1509 with the display of the Applications screen, FIG. 4.

As noted hereinabove, if the user selects an application then selects the Apply button 4f on the Applications screen in FIG. 4, execution continues, as shown at block 1517 of FIG. 15, with the display of the Mechanisms screen shown in FIG. 5.

The Mechanisms screen in Mg. 5 shows the Mechanism level reports available under the corresponding, "Process Control," selected from the Applications screen in FIG. 4. From the Mechanisms screen shown in FIG. 5, the user again has five options as illustrated at block 1517 in FIG. 15. The user may select the Cancel button 5g; select the Control button 5c; select the Report button 5d; select or highlight a mechanism then select the Execute button 5h; or select or highlight a mechanism then select the Apply button 5f.

Figure 5:
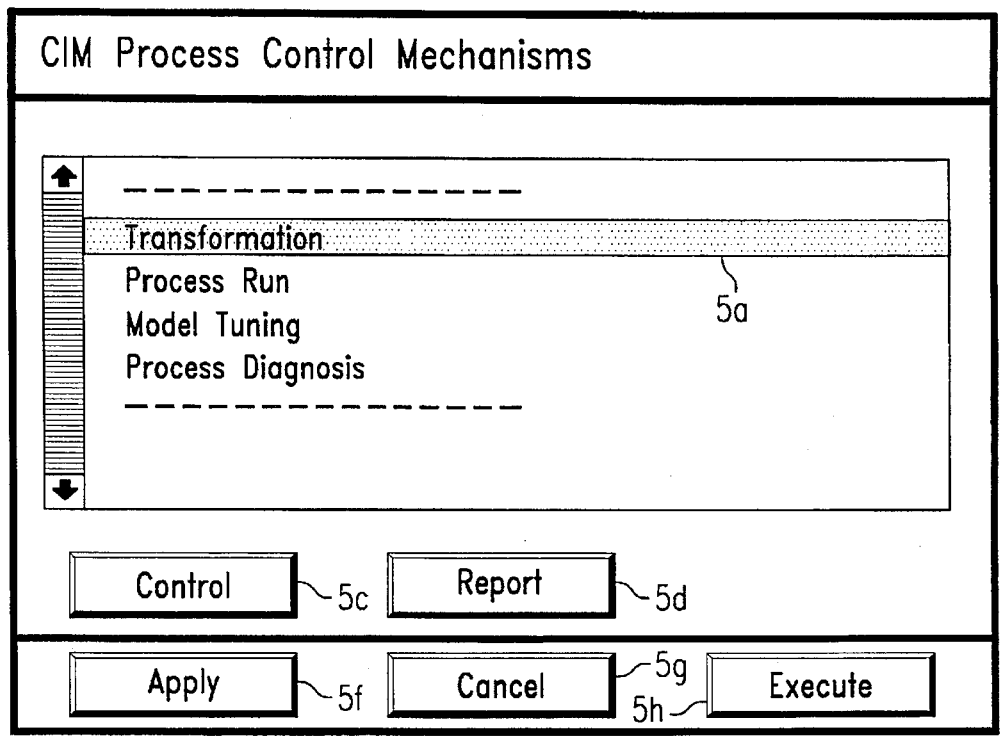

Selection of the Cancel button 5g from the Mechanisms screen in FIG. 5 returns the user to the Application screen, FIG. 4. Selection of the Control button 5c generates the Test Control Specification screen, FIG. 17, discussed in detail hereinabove. Selection of the Report button 5d causes the test history and reporting 1d to generate, in accordance with the flow diagram illustrated in FIG. 18B, the Mechanism Report screen shown in FIG. 13. Selection of the Execute button 5h starts the execution of test cases described in the testing hierarchy under the mechanism "Transformation", shown selected at 5a in FIG. 5. The execution of test cases, illustrated in FIG. 16, is discussed in more detail hereinbelow.

Figure 6:
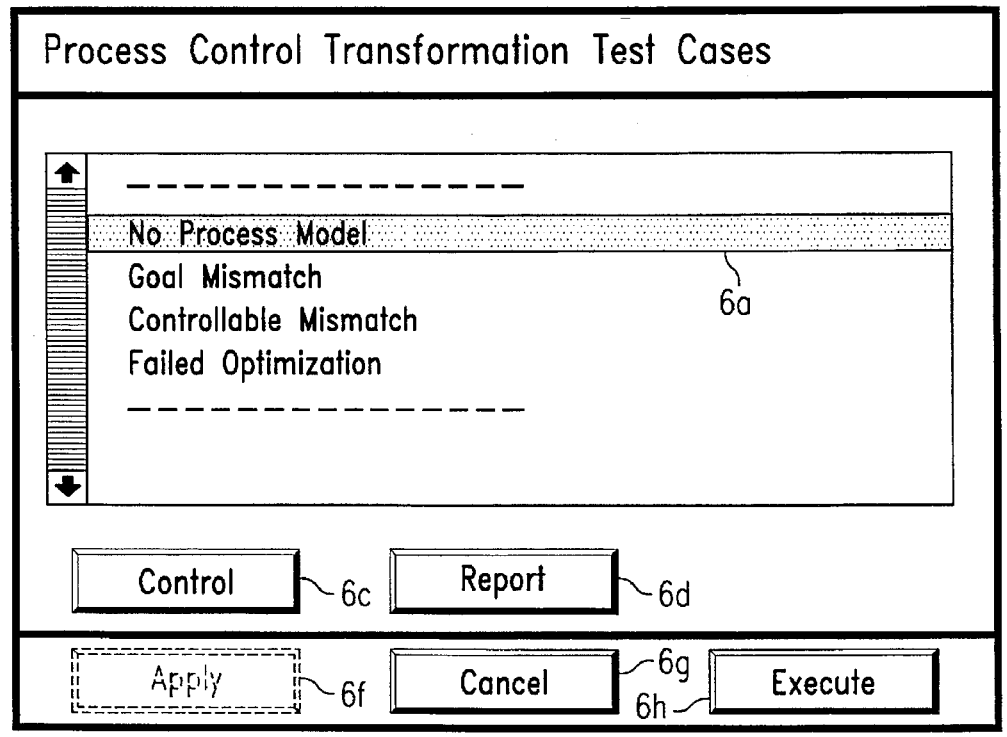

If the user selects a mechanism then selects the Apply button 5f, execution continues as shown at block 1525 of FIG. 15, with the display of the Test Cases screen as shown in FIG. 6.

From the Test Cases screen shown in FIG. 6, the user has only four options. The user may select the Cancel button 6g; the Control button 6c; the Report button 5d; or a test case then select the Execute button 6h. Since test case selection is the lowest level in the testing hierarchy, the Apply button 6f is inoperable and thus shown with dotted lines, meaning it is not selectable on the Test Cases screen, FIG. 6.

If the user selects the Cancel button 6g from the Test Cases screen in FIG. 6, execution proceeds, as shown in FIG. 15 at block 1517, with the redisplay of the Mechanisms screen, FIG. 5.

If the user selects the Control button 6c from the Test Cases screen in FIG. 6, execution continues, as shown at block 1519 in FIG. 15, at block 1701 as shown in FIG. 17, discussed hereinabove.

Figure 18E:
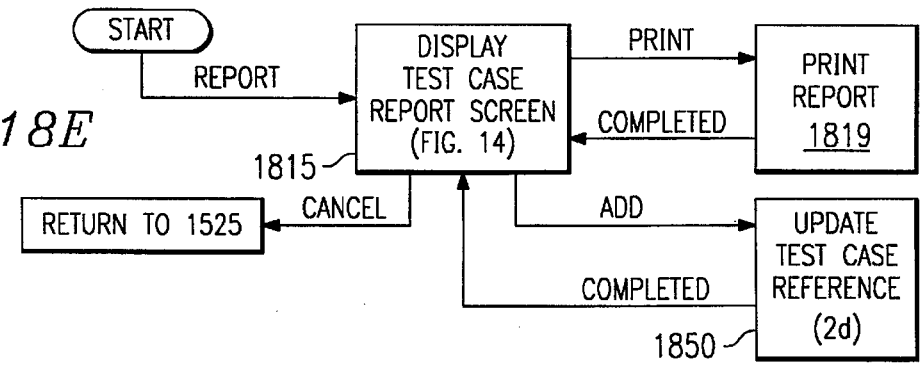
Figure 18F:
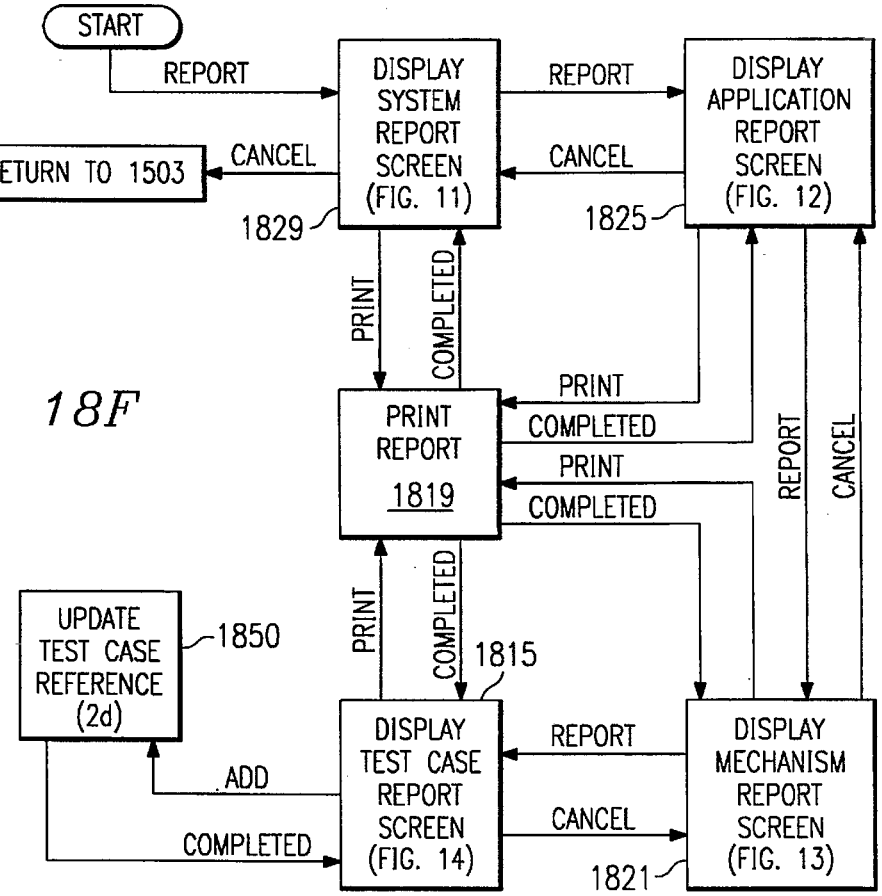

If the user selects the Report button 6d from the Test Cases screen shown in FIG. 6, execution proceeds from block 1513 in FIG. 15 to the data flow diagram shown in FIG. 18E. As shown at block 1815, the Test Case Report screen, FIG. 14 is displayed. From the Test Case Report screen, FIG. 14, Selection of the Cancel button 14g returns control to block 1525 in FIG. 15 which displays the Test Case Screen, FIG. 6. Selection of the Print button 14i prints, as shown at block 1819 in FIG. 18F, the report shown in the Test Case Report screen, FIG. 14. Selection of the Make Reference button 14j stores the current test case execution results to the object test case results 1m for comparison against future executions of the same test case.

If the user selects a test case, for example, the test case "No Process Model" is shown selected at 6a in FIG. 6, then selects the Execute button 6h on the Test Cases screen shown in FIG. 6, execution continues as shown in FIG. 15 at block 1515, with the test execution data flow diagram shown in FIG. 16.

Preparation for actual test case execution begins, as shown at block 1601 of FIG. 16, by sending a "get control parameters" message to the test case control 2h of the test coordinator 1c. The control parameters include the policy variables as initially defined or as modified through the Control Parameters screen, shown in FIG. 7 and stored in the policy parameters object 1k. Upon receipt of the control parameters, as shown at block 1603 of FIG. 16, the Test Status and Control screen, FIG. 9, is displayed and an "execute test" message is sent to the test sequence control 2f of the test coordinator 1c.

While the test cases are executing, as long as a "test complete" message has not been received from the test coordinator 1c, as shown at block 1625 in FIG. 16, the user can pause test case execution by selecting the Pause button 9k on the Test Status and Control screen, FIG. 9, or abort the test execution by selecting the Abort button 9o. If the Pause button 9k is selected, a "pause" message is sent to the test sequence control 2f of the test coordinator 1c. Testing is then suspended after the test case currently executing has completed until the user selects the Continue button 9l on the Test Status and Control screen, FIG. 9. Once the Continue button 9l is selected, a "resume" message is sent to the test sequence control 2f of the test coordinator 1c at block 1625 and test case execution continues.

If the Abort button 9o is selected, the user is prompted with a confirmation message shown at 9n. The user then confirms the selection by selecting the Confirm button 9m of FIG. 9. If the abort is confirmed, an "abort" message is sent to the test sequence control 2f of the test coordinator 1c.

If a "status update" message is received at block 1603 in FIG. 16 from the test run status 2g of the test coordinator 1c, then the Test Status and Control screen shown in FIG. 9 will display updated parameters in accordance with the data received from the test run status 2g.

Once a "test complete" message is received at block 1603 from the test coordinator 1c at block 1625 in FIG. 16, control returns to block 1525 in FIG. 15 if test cases were executed at the test case level, to block 1517 in FIG. 15 if test cases were executed at the mechanism level, to block 1509 in FIG. 15 if test cases were executed at the application level, or to block 1503 in FIG. 15 if test cases were executed at the system level.

If the user selects the Report button 6d from the Test Cases screen, FIG. 6, control is transferred to block 1815 in FIG. 18E and the Test Cases Report screen, FIG. 14, is presented. On the Test Cases Report screen of FIG. 14, the user has the option of making the execution results of the selected test case a reference test case stored in the reference test cases object 1j for comparison against future runs of the same test case by selecting the Make Reference button 14j; cancelling the reporting by selecting the Cancel button 14g; or printing the test case report by selecting the Print button 14i.

If the user selects the Make Reference button 14j, operations proceed at block 1850 in FIG. 18E where a "make reference" message is sent to the test case reference 2d of the test history and reporting 1d. If the user selects the Print button 14i, operations proceed to block 1819 where a "print" message is sent to the test reporter 2e of the test history and reporting 1d and operation continues in FIG. 18F as discussed hereinabove. Selecting the Cancel button 14g in FIG. 14 will return the user to the Mechanisms Report screen shown in FIG. 13.

Figure 2:
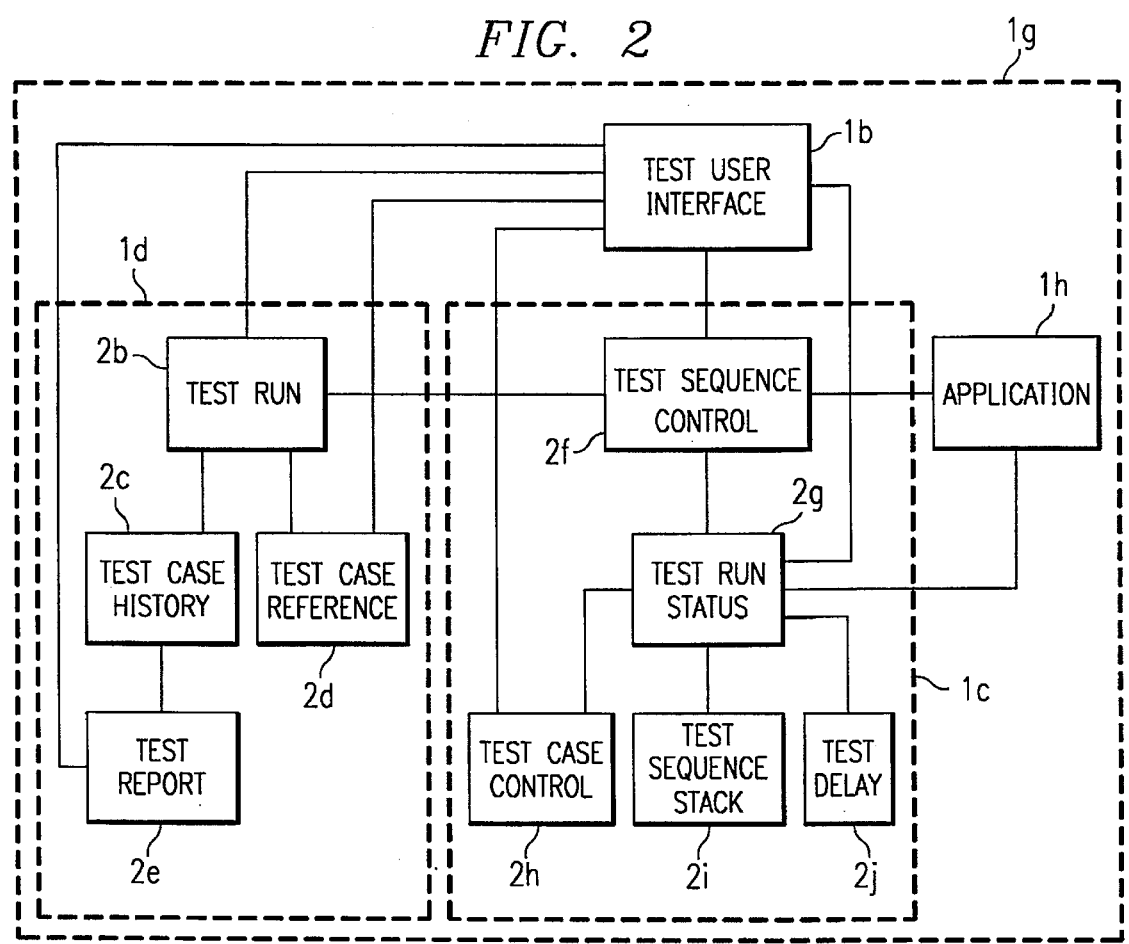
FIG. 2 illustrates a more detailed block diagram of the present invention.

Test history and reporting 1d further includes, as illustrated in more detail in FIG. 2, test run 2b, test case history 2c, test case reference 2d and test reporter 2e. Test run 2b accesses test case history information through test case history 2c and evaluates trends and identifies failure patterns in the testing results. Test case history 2c includes the test case histories of each execution of each test case. Thus, one purpose of test case history 2c is to support endurance and stress testing over an extended period of time. Test reporter 2e accesses test case history 2c to generate various reports reflecting specific teat case execution results.

Test coordinator 1c, as further illustrated in FIG. 2, includes test sequence control 2f, test run status 2g, test case control 2h, test sequence stack 2i and test delay 2j.

Test sequence control 2f is operable to obtain available test case information from the application 1h and to make that information available to the test user interface 1b and the other components of the present invention. Test sequence control 2f also responds to messages from the test user interface 1b, such as messages to abort testing. In addition, test sequence control 2f registers the test cases needed to test, monitor and diagnose the application 1h using the present invention.

Figure 21A:
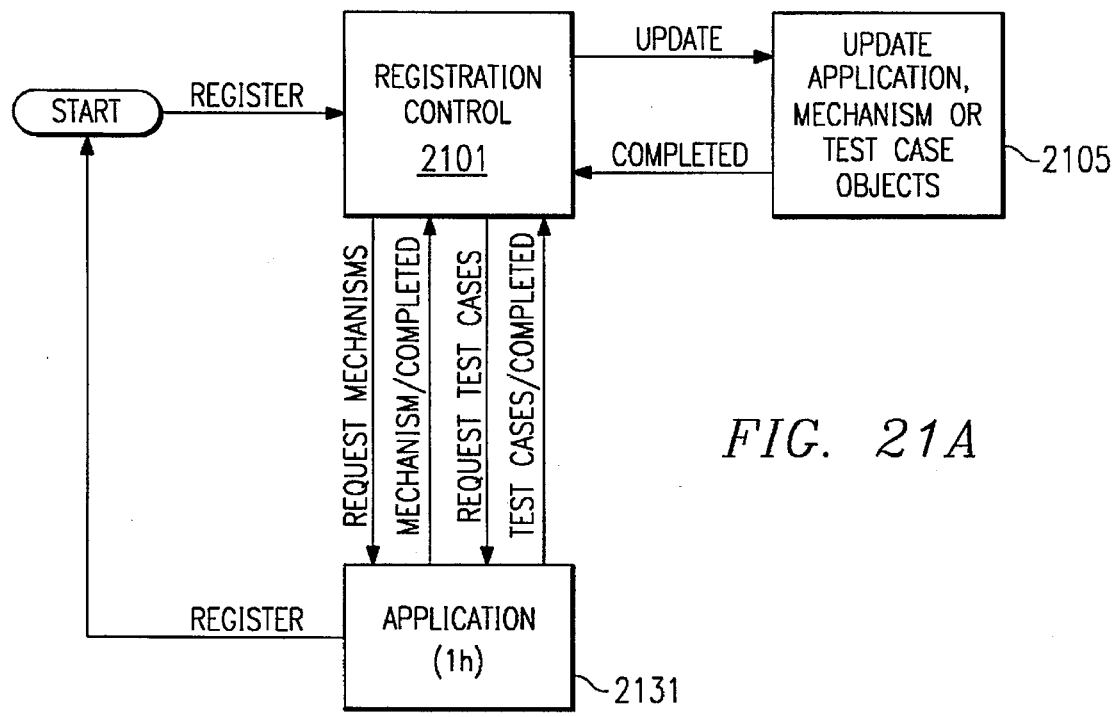
FIGS. 21A–21B illustrate the operation of the test sequence control module in the present invention.
Figure 21B:
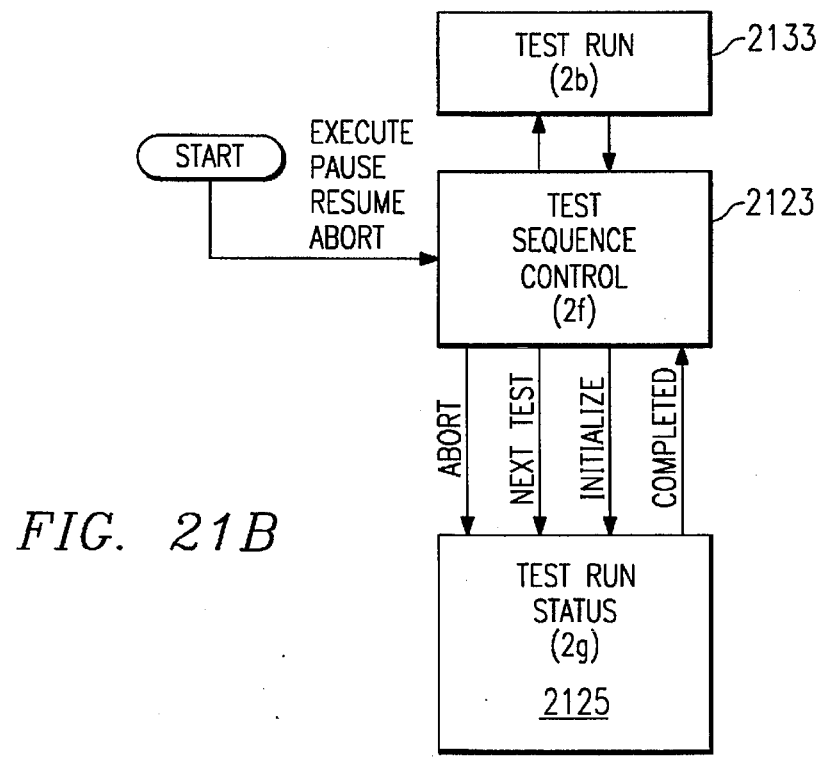

The operation of the test sequence control 2f is illustrated generally in FIGS. 21A–21B. If a "register" message is received from the test user interface 1b, operation proceeds at block 2101 where the application parameters received with the "register" message are used to request the mechanism data by sending a "get mechanisms" message to the application 1h at block 2131. The received information is then used to request the test case data for each mechanism by sensing a "get test cases" message to each test object in the application 1h at block 2131. Once all test case information is received, the information is sent at block 2105 to update the test case definition object 1n shown in FIG. 1.

If test sequence control 2f receives an "execute" message, operation proceeds at block 2123 where an "initialize" message is sent to test run status 2g at block 2125 in FIG. 21B. A "get control parameters" message is then sent to test case control 2h, shown at block 2127 in FIG. 22, which depicts the operation between the test run status 2g and the other modules in the test coordinator 1c. After receipt of the control parameters, a "change mode" message is sent to the application 1h at block 2131 if disruptive or destructive tests are involved. If an acknowledgement indicating that the requested mode change was not accepted by the application 1h is received, the test sequence control 2f at block 2123 in FIG. 21B is sent the information and the test user interface 1b is updated to indicate that the requested test execution is denied by the application 1h. If the mode change request is accepted by the application 1h, test execution proceeds as shown in FIG. 16, described in more detail hereinabove.

Test sequence Control 2f at block 2123 in FIG. 21B can receive a "pause", "resume", or "abort" message while executing a test sequence. The "pause" and "resume" messages are used to determine whether or not to send a "next test" message to test run status 2g at block 2125. If an "abort" message is received by the test sequence control 2f at block 2123 in FIG. 21b, the "abort" message is sent to test run status 2g at block 2125. Test run status 2g includes information to determine whether a mode change is needed and will send a change mode request to the application 1h at block 2131 only if required.

The test run status 2g maintains the information relating to the execution status of the currently executing test case. Information supplied by the test run status 2g includes information about the number of tests remaining, the current application, mechanism and test case being executed, and the estimated time remaining. This information is presented to the user through the Test Status and Control screen shown in FIG. 9.

Figure 22:
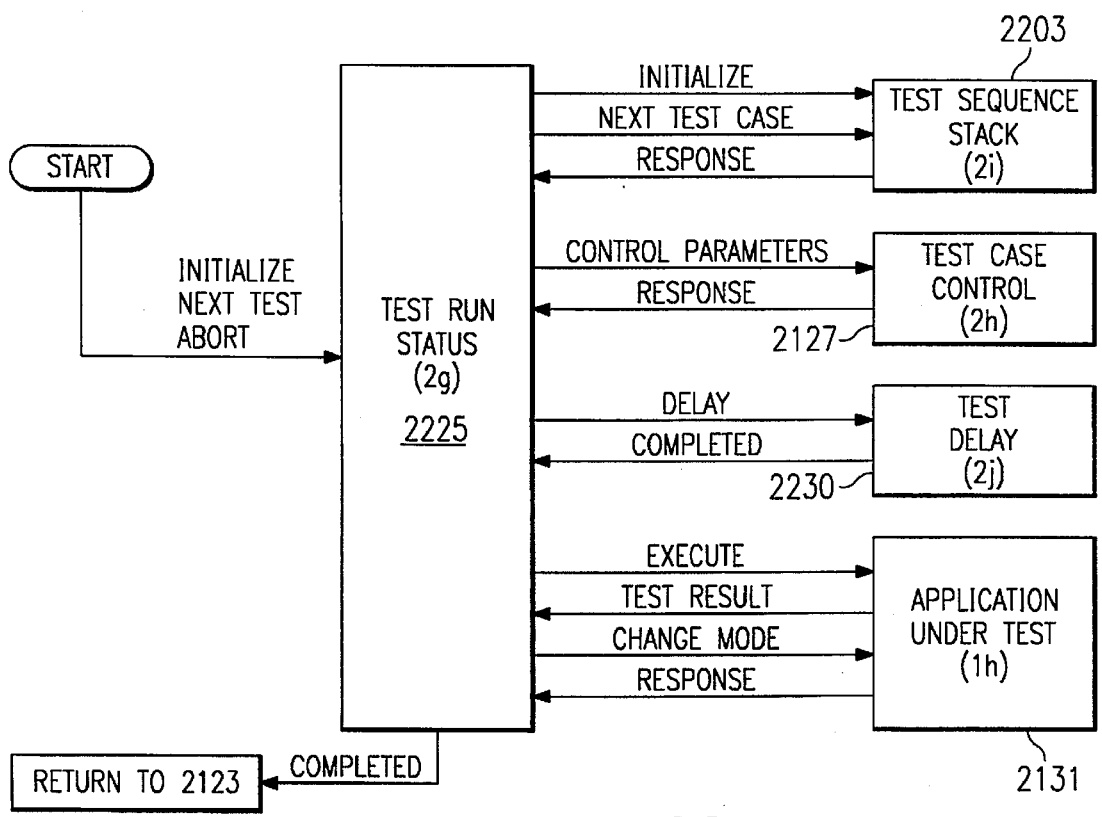
FIG. 22 illustrates the operation of the test run status module in the present invention.

Operation of test run status 2g, is shown generally in FIG. 22. If an "initialize" message is received by test run status 2g from test sequence control 2f, the test case sequence is initialized at block 2203 and control is returned to 2125 in FIG. 21B. When a "next test" message is receive by test run status 2g from test sequence control 2f, the next test case information is retrieved from test sequence stack 2i at block 2203. A "get control parameters" message is then sent to test case control 2h at block 2127. With the retrieved control parameters, test sequence stack 2i at block 2203 is updated and test delay 2j is initialized at block 2230.

If the iteration count is not zero and the delay time has expired, the iteration count is decremented and a "status update" message is sent to the test user interface 1b. The test user interface 1b, then updates the values of the policy variables and other information displayed on the Test Status and Control screen shown in FIG. 9.

Operation continues at block 2225 where an "execute" message is sent to the application 1h at block 2131. When the test case results are received, execution of the test case is complete and control is returned at block 2123 in FIG. 21B to test sequence control 2f.

If an "abort" message is received by test run status 2g from test sequence control 2f, test sequence stack 2i is cleared and control returned, as illustrated at block 2123 in FIG. 21B, to test sequence control 2f.

Test case control 2h maintains the policy variable values which are used to control the testing environment. The information available, described hereinabove, includes testing patterns such as the number of times to repeat a test sequence and the delay time between repeated executions. Additional information provided by the policy variables describes the action to be taken when a test failure is detected (e.g., to stop testing on failure of a test case). Default values are defined at system startup may be overridden at any time. Selected policy variables are further modifiable through the Control Parameters screen in FIG. 7, discussed hereinabove.

Figure 23:
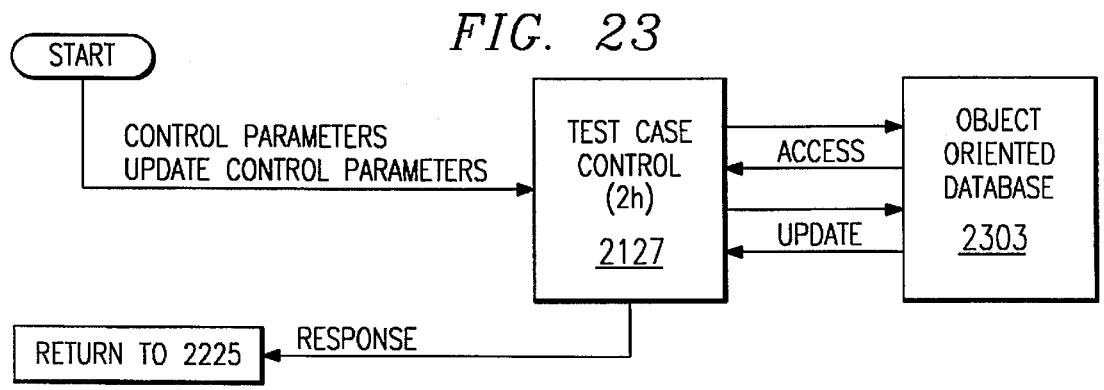
FIG. 23 shows the operation of the test case control module in the present invention.
Figure 24:
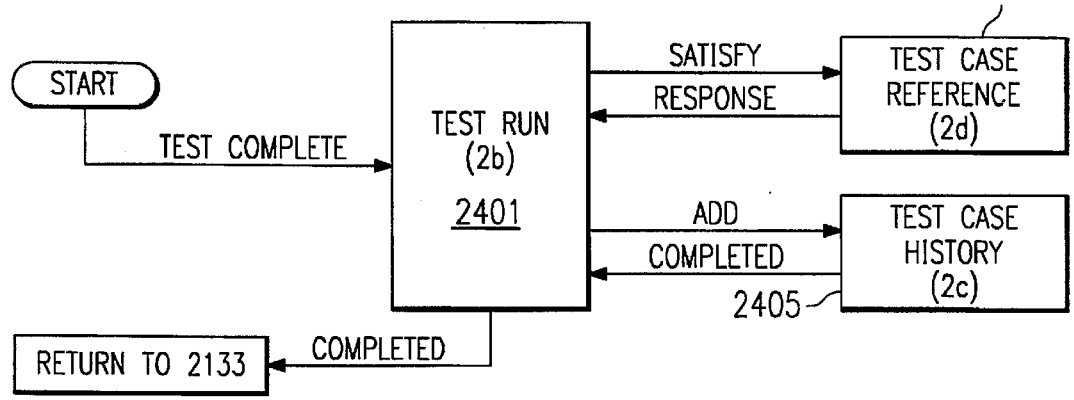
FIG. 24 shows the operation of the test run module in the present invention.
Figure 25:
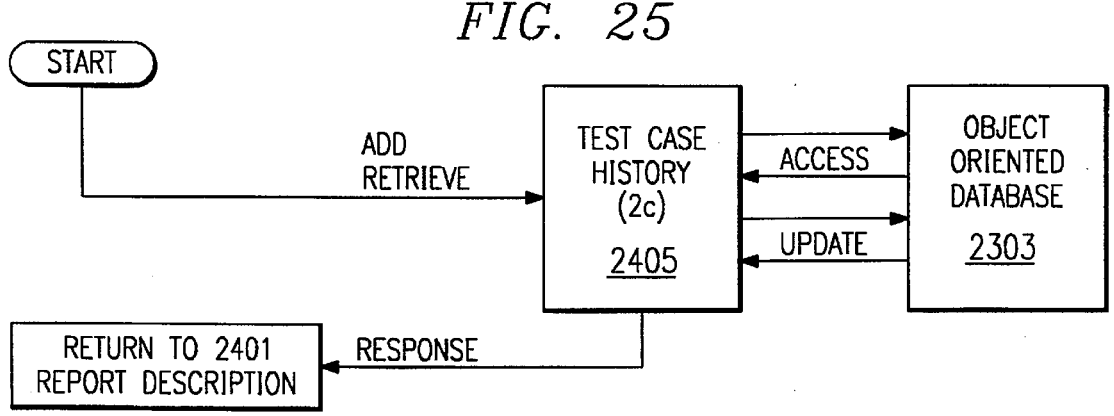
FIG. 25 shows the operation of the test case history module in the present invention.

The general operation of test case control 2h is depicted in FIG. 23. If a "get control parameters" message is received, the control parameters are retrieved from the policy parameters object 1k in the object oriented database 1i at block 2303. If an "update control parameters" message is received, the values of the control parameters are updated in the policy parameters object 1k in the object oriented database 1i at block 2303.

Test run 2b coordinates information pertaining to test case run histories stored in the test case results object 1m and the test case references stored in the reference test cases object 1j. The operation of test run 2b is shown generally in FIG. 24 starting at 2401. If a "test complete" message is received from test sequence control 2f, a "satisfy" message is sent at block 2403 in FIG. 24 to test case reference 2d. If the test results match at least one of the available references, the response from test case reference 2d will indicate a Pass status for this test case execution. If none of the test case references match the test results, the response from test case reference 2d will indicate a Fail condition. If no references are found for the current executed test case, a response of "Unknown" is returned. Regardless of the response from test run at 2403, the test case results are included in the test case results object 1m at block 2405.

Test case history 2c provides the actual test case results information for all previously executed test cases. The operation of test case history 2c is illustrated generally in FIG. 25. If an "add" message is received from test run 2b, the test results data for the executed test case are added at 2303 to the test case results object 1m in the object oriented database 1i. If a request for the test case history, a "retrieve" message, is received, the appropriate test case history objects are retrieved from the test case results object 1m in the object oriented database 1i.

Test case reference 2d stores and retrieves user selected test case execution results which are used to compare against other executions of the same test case. Multiple test case execution results can be designated as a reference to compare to future executions for each of the selected test cases.

Figure 26:
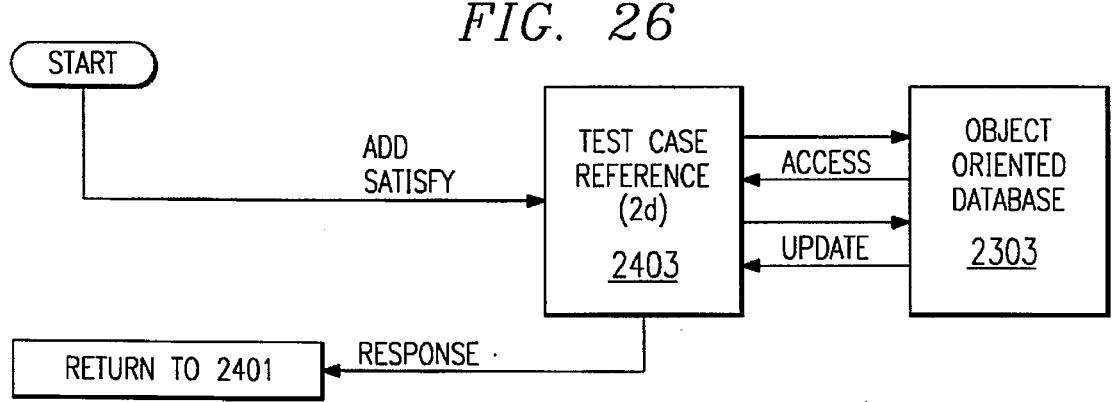
FIG. 26 illustrates the operation of test case reference module in the present invention.

Operation of test case reference 2d is illustrated generally in FIG. 26. If a "satisfy" message is received from test run 2b then at 2403 the reference test cases object 1j in the object oriented database 1i is accessed to determine if there are any test case references for the current test case. If there are, the current test case execution results are compared with the test case reference information. If the comparison is favorable, a Pass indicator is returned to test run 2b at 2401. If the comparison is not favorable a Fail indicator is sent to the test run 2b. A response of "Unknown" is returned if there are no test case references for this test case. The comparison between the current test case and the references is made in accordance with the policy parameters discussed in detail hereinabove.

If an "add" message is received from test user interface 1b, the selected test case execution result information is added at block 2403 to the reference test case object 1j in the object oriented database 1i.

Test report 2e is then used to generate the test case execution results reports shown in FIGS. 11–14. The reports shown in FIGS. 11–14 and the operation of the test reporter 2e were discussed in more detail hereinabove.

Although the present invention has been described in detail, it should be understood that various changes, substitutions and alterations can be made thereto without departing from the spirit and scope of the present invention as defined by the appended claims.

What is claimed is:

1. A computer system for post deployment testing, dynamic monitoring and diagnosis of an on-line application, said on-line application including and operable to execute at least one built-in test case built into said application, said built-in test case operable to test at least one aspect of said on-line application, the system comprising:

a test coordinator responsive to said on-line application for storing registration information describing said at least one built-in test case to a test case definition storage;

a test user interface responsive to a user for presenting said at least one built-in test case to said user in accordance with the registration information and for accepting a request to initiate execution of said at least one built-in test case;

said test coordinator responsive to said request for initiating and controlling said execution of said at least one built-in test case in accordance with a set of policy variables and for periodically providing status information to said test user interface during said execution of said at least one built-in test case;

said test user interface further operable to present said status information to said user during said execution of said at least one built-in test case; and test history reporting responsive to said test user interface and said test coordinator for evaluating execution results of said at least one built-in test case in accordance with said set of policy parameters, thereby generating evaluation results.

2. The system of claim 1 wherein said test history reporting responsive to said test user interface and said test coordinator, is further operable to evaluate and diagnose anomalies detected from said at least one aspect of said on-line application by comparing said execution results of said at least one built-in test case to at least one reference test case in accordance with said set of policy parameters.

3. The computer system of claim 1 wherein said test history reporting is further operable to generate reports including said evaluation results and said execution results.

4. The system of claim 1 wherein test case definition includes:

a pre-test for setting up an operating environment in preparation for said execution of said at least one test case;

a test for testing said at least one aspect of the on-line application;

a post-test for resetting the operating environment after said execution of said at least one test case; and a test mode for classifying said at least one built-in test case in terms of its effect on other production activities in the operating environment.

5. The computer system of claim 1 wherein said test user interface includes means within said on-line application for initiating execution of said at least one built-in test case.

6. The computer system of claim 1 wherein said test history reporting is further operable to store said execution results of said at least one built-in test case as another reference test case.

7. A computer system for post deployment testing, monitoring and diagnosis of an on-line application, said on-line application including and operable to execute at least one built-in test case built into said on-line application, said built-in test case operable to test at least one aspect of said on-line application, the system comprising:

a test coordinator responsive to said on-line application for storing registration information describing said at least one built-in test case to a test case definition storage;

a test user interface responsive to a user for presenting said at least one built-in test case to said user in accordance with the registration information and for accepting a request to initiate execution of said at least one built-in test case;

said test coordinator responsive to said request for initiating and controlling said execution of said at least one test case in accordance with a set of policy parameters and for periodically providing status information to said test user interface during said execution of said at least one built-in test case;

said test user interface further operable to present said status information to said user during said execution of said at least one built-in test case;

test history reporting responsive to said test user interface and said test coordinator for evaluating execution results of said at least one built-in test case in accordance with said set of policy parameters, thereby generating evaluation results; and said test user interface further including means for presenting said execution results and said evaluation results to said user.

8. A computer system for post deployment testing, monitoring and diagnosis of an on-line application, said application including and operable to execute at least one built-in test case built into said on-line application, said built-in test case operable to test at least one aspect of said on-line application, the system comprising:

a test coordinator responsive to said on-line application for storing registration information registering said at least one built-in test case;

a test user interface for generating a first request to initiate execution of said at least one built-in test case;

said test coordinator responsive to said test user interface for initiating and controlling said execution of said at least one built-in test case in accordance with a set of policy parameters and for periodically providing status information to said test user interface during said execution of said at least one built-in test case;

said test user interface further responsive to said status information for displaying said status information during said execution of said at least one built-in test case;

test history reporting responsive to said test user interface and said test coordinator for evaluating execution results of said at least one built-in test case in accordance with said set of policy parameters, thereby generating evaluation results; and said test coordinator further responsive to said test history reporting for initiating and controlling execution of at least one diagnostic test case in response to said evaluation results.

* * * * *